US010800425B2

(12) United States Patent
Stefan et al.

(10) Patent No.: US 10,800,425 B2
(45) Date of Patent: Oct. 13, 2020

(54) METHOD AND SYSTEM FOR PREVENTING CONCENTRATION ERRORS WHEN DRIVING A MOTOR VEHICLE

(71) Applicant: FORD GLOBAL TECHNOLOGIES, LLC, Dearborn, MI (US)

(72) Inventors: Frederic Stefan, Aachen (DE); Uwe Gussen, Huertgenwald (DE); Christoph Arndt, Moerlen Rheinland-Pfalz (DE)

(73) Assignee: Ford Global Technologies, LLC, Dearborn, MI (US)

( * ) Notice: Subject to any disclaimer, the term of this patent is extended or adjusted under 35 U.S.C. 154(b) by 313 days.

(21) Appl. No.: 15/342,891

(22) Filed: Nov. 3, 2016

(65) Prior Publication Data

US 2017/0120925 A1   May 4, 2017

(30) Foreign Application Priority Data

Nov. 4, 2015 (DE) .................. 10 2015 221 651

(51) Int. Cl.
| | |
|---|---|
| *B60W 40/09* | (2012.01) |
| *B60W 30/12* | (2020.01) |
| *B60W 30/14* | (2006.01) |
| *B60W 40/06* | (2012.01) |
| *B60W 50/14* | (2020.01) |

(Continued)

(52) U.S. Cl.
CPC ........... *B60W 40/09* (2013.01); *B60W 30/12* (2013.01); *B60W 30/14* (2013.01); *B60W 40/06* (2013.01); *B60W 50/14* (2013.01); *G01C 21/3697* (2013.01); *B60W 2040/0818* (2013.01); *B60W 2540/30* (2013.01); *B60W 2552/05* (2020.02); *B60W 2554/00* (2020.02); *B60W 2556/50* (2020.02)

(58) Field of Classification Search
CPC ...................................................... G08B 21/06
See application file for complete search history.

(56) References Cited

U.S. PATENT DOCUMENTS

| | | | | |
|---|---|---|---|---|
| 8,918,227 | B2 * | 12/2014 | Junge | ..................... A61B 5/162 |
| | | | | 180/272 |
| 2010/0219955 | A1 * | 9/2010 | Demirdjian | .............. A61B 5/18 |
| | | | | 340/575 |

(Continued)

FOREIGN PATENT DOCUMENTS

| | | |
|---|---|---|
| CN | 102101438 A | 6/2011 |
| CN | 103003854 A | 3/2013 |

(Continued)

OTHER PUBLICATIONS

German Search Report dated Oct. 21, 2016 for German Application No. 102015221651.9, 5 pgs.

*Primary Examiner* — Imran K Mustafa
(74) *Attorney, Agent, or Firm* — Gregory P. Brown; Brooks Kushman, P.C.

(57) ABSTRACT

Parameters that characterize a current driving situation of the motor vehicle are acquired. On the basis of the acquired parameters a current level of monotony is determined as a characterization of a monotony of the current driving situation. Whether the calculated current level of monotony exceeds a predetermined threshold is checked, and an exercise for the driver to increase concentration on driving the motor vehicle is performed when the threshold is exceeded.

16 Claims, 2 Drawing Sheets

(51) Int. Cl.
*G01C 21/36* (2006.01)
*B60W 40/08* (2012.01)

(56) References Cited

U.S. PATENT DOCUMENTS

| | | | | |
|---|---|---|---|---|
| 2012/0154156 A1* | 6/2012 | Kuntzel | ............ | G08B 21/06 340/575 |
| 2014/0139655 A1* | 5/2014 | Mimar | ............ | G08B 21/06 348/77 |
| 2014/0371981 A1* | 12/2014 | Nordbruch | ............ | G07C 5/0841 701/36 |

FOREIGN PATENT DOCUMENTS

| | | |
|---|---|---|
| CN | 103273882 A | 9/2013 |
| CN | 103606246 A | 2/2014 |
| DE | 102007003694 B3 | 4/2008 |
| DE | 102009058459 A1 | 6/2011 |
| EP | 2584548 A1 | 4/2013 |
| JP | 2015153429 A | 8/2015 |

* cited by examiner

METHOD AND SYSTEM FOR PREVENTING CONCENTRATION ERRORS WHEN DRIVING A MOTOR VEHICLE

CROSS-REFERENCE TO RELATED APPLICATIONS

This application claims foreign priority benefits under 35 U.S.C. § 119(a)-(d) to DE 10 2015 221 651.9 filed Nov. 4, 2015, which is hereby incorporated by reference in its entirety.

TECHNICAL FIELD

The disclosure relates to a method and to a system for preventing driver concentration errors when driving a motor vehicle.

BACKGROUND

Some driving situations when driving a motor vehicle can be very monotonous for a driver. For instance, such situations may include when driving at night on a motorway with only a few other road users, with almost no lane changes, direction changes, accelerating and braking operations or the like taking place. If such monotonous driving situations persist over a prolonged period, this can result in a drop in driver concentration on the traffic and on his vehicle. Ultimately, this can cause tiredness or even drowsiness of the driver. Such lapses in concentration by the driver can produce very dangerous concentration errors when driving the motor vehicle. For instance, the driver reacts too late or even not at all to a suddenly changing driving situation, or inadvertently leaves the lane he is in.

Various methods for ascertaining tiredness or drowsiness of the driver when driving a motor vehicle are known for avoiding hazardous situations of this type. These methods monitor driver behavior and determine, for instance, a relevant degree of concentration or tiredness of the driver from how often or how long the eyelids of the driver are closed or from the driver's steering behavior when staying in a lane of use. On ascertaining a dangerous level of tiredness, then, for example, an acoustic warning is given or fresh air is supplied or an invitation is made to take a break.

EP 2 584 548 describes such a method for determining a driver's concentration on driving a vehicle. To do this, data is cyclically acquired by a steering angle sensor and a front camera and stored in a memory. An analysis unit performs a statistical analysis of the acquired data. A detection unit determines a driver concentration level from statistical values and predetermined thresholds. For instance, a very high level of concentration of the driver is assumed if a number of sign changes for a steering angle equals a number of changes in direction of the road, and if a correction of lateral deviations of the vehicle lies below a predetermined threshold. On the other hand, if a number of lane crossings in a defined time interval exceeds a predetermined threshold, then a very poor level of concentration of the driver is assumed and the driver is invited to take a break.

One disadvantage of the known method is that the driver is already tired and has low concentration on driving when a warning is given. This means that dangerous driving situations can already arise as a result of concentration errors. If the driver feels that the warning is premature, the driver might delay a break. If the driver delays a suggested break, his concentration continues to drop. The danger to the driver and other road users resulting from driving errors continuously increases.

SUMMARY

An object of the present disclosure is to define a method and a system for preventing concentration errors when driving a motor vehicle, which method and system avoid or at least reduce the disadvantages mentioned and in particular provide effective prevention of concentration errors caused by tiredness.

In a method according to the disclosure for preventing driver concentration errors when driving a motor vehicle, parameters that characterize a current driving situation of the motor vehicle are acquired. In particular, the parameters are suitable for calculating a level or degree of monotony of the driving situation for the driver. Acquired parameters may be, for example, live or stored data from existing or additionally provided sensors, devices or systems of the vehicle. It is also possible to use as parameters, data that has been transmitted to the motor vehicle via a public wireless network, for instance a mobile communications link to the Internet, via a radio station, for example a Traffic Message Channel (TMC), or via a short-range link to other vehicles in the vicinity. Examples of data used as parameters are given in greater detail later.

A current level of monotony as a characterization of a monotony of the current driving situation is calculated on the basis of the acquired parameters. This can be performed, for example, by a weighting function or a probability function that takes into account all the required parameters or a selection thereof. In this process, it is possible to weight individual parameters or even to weight a plurality of interacting parameters. In particular, the level of monotony can constitute a probability value for a monotony of a driving situation.

The method also includes checking whether the calculated current level of monotony exceeds a predetermined threshold. On the threshold being exceeded, an exercise for the driver for the purpose of increasing concentration on driving the motor vehicle is performed. In particular, according to one embodiment, the check can be performed continuously or cyclically in order to allow an exercise to be stopped when the threshold is no longer being exceeded. An exercise is preferably performed interactively via a human/machine interface of the vehicle. In this case, for instance, instructions or tasks for the driver can be output, and a response of the driver received as input. The exercises are preferably designed such that the driver is not distracted from the actual process of driving. Thus the driver should not need to look away from the roadway when performing an exercise, or should need to look away only very briefly.

Such a method according to the disclosure stimulates the concentration of a driver during a monotonous driving situation. This is done already long before the monotony produces tiredness or drowsiness of the driver and hence an increased risk of concentration errors. Instead of warning the driver of an existing tiredness or drowsiness, these conditions are effectively prevented or at least delayed by the method according to the disclosure.

According to a preferred embodiment of the disclosure, at least one live environment parameter for characterizing a driving environment is acquired as a parameter of the driving situation. For instance, one or more parameters for characterizing a current time of day, a type of road, a volume of traffic, weather conditions or any combination of these environment characteristics can be acquired. The time of day can be provided by a vehicle clock, for example. A type of road is understood to mean here a condition and construction of the road being traveled, for instance a motorway, a country lane etc. Data from a GPS or navigation system can be used for this purpose. Parameters for a volume of traffic can be acquired, for example, using a radar system of the vehicle, via a connection to a public network containing an information system, for example a Cloud-based information system, or via a wireless information transfer with other vehicles in the vicinity. Rain or snowfall, for example, can be detected as weather conditions by sensors of the vehicle. In particular at night or when it is raining, a journey quickly becomes monotonous to the driver because of a limited field of view. A motorway journey in which there are very few other road users can also be very monotonous for the driver.

According to another advantageous embodiment of the disclosure, at least one live load parameter for characterizing a driver load is acquired as a parameter of the driving situation. For example, suitable sensors are used to detect a frequency or intensity of pedal use, a frequency or intensity of control operations, a frequency of switching operations, a frequency or length of use of a direction indicator, a frequency or length of use of a high beam or any combination of these load characteristics. Alternatively or additionally, it is also possible to detect the viewing behavior of the driver, for instance how often the driver uses a wing mirror or rearview mirror, or how often and for how long the driver looks away from the roadway. In particular, a sustained low load on the driver is an indicator of a monotonous, soporific driving situation.

In one embodiment according to the disclosure, at least one live status parameter for characterizing a vehicle status is acquired as a parameter of the driving situation. In particular, a speed pattern or a speed characteristic or values derived therefrom such as, for instance, an acceleration characteristic, maximum values for the speed or the acceleration, a frequency of acceleration operations or braking operations and such like, can be acquired as status parameters. Similarly, a direction-change pattern and/or a direction-change characteristic or values derived therefrom such as, for instance, maximum values or a frequency of direction changes etc. can also be acquired. Further examples of status parameters of the vehicle are a performed activation or other usage parameters of assistance systems such as, for example, an adaptive cruise control system or a lane-keeping assistant, or of entertainment systems such as radio, compact disk (CD) player etc. A degree of monotony of the driving situation can likewise be determined from these status parameters. Thus, for instance, traveling for a prolonged time at the same speed or with very few changes in direction is an indicator of a monotonous driving situation.

In addition, in one embodiment, at least one live parameter for characterizing the travel route is preferably acquired as a parameter of the driving situation. A remaining travel time or distance to the destination or until a scheduled break can be acquired, for example, as the parameter. These can be determined, for instance, using a navigation device in which the driver has entered the destination or scheduled breaks. Initiation of exercises during a monotonous driving situation can be inhibited when the remaining journey period is short.

According to one embodiment of the disclosure, determining the current level of monotony takes into account previous levels of monotony over a specified time period or a specified distance. The current level of monotony thus also incorporates a particular degree of the monotony in addition to a time length of a monotonous driving situation. For instance, account is now taken of previous short driving situations in which there was raised driver activity in an otherwise monotonous journey. The level of monotony can thereby be determined more precisely and hence exercises initiated more appropriately.

According to one embodiment of the disclosure, driving according to a specified driving behavior is performed as an exercise for the driver. For example, the driver can be invited to change lanes, to drive at a certain speed, to decelerate or accelerate slightly, to assume a certain lateral alignment of the vehicle inside a lane, or to switch on a high beam or direction indicator. In this case, it is possible to select one or more of these driving behaviors in a random order. In addition, inviting the driver to follow a specified fuel-saving driving behavior is possible as an exercise. Said fuel-saving driving behavior may be, for instance, a pulse & glide style, i.e. alternating between brief acceleration to a top limit speed and a longer coast down to a lower limit speed, or may be an optimum gear-change between fifth and sixth gear. Such exercises are highly effective in counteracting a monotonous driving situation and increase the driver's concentration on driving.

In addition, according to a preferred embodiment of the disclosure, activating or deactivating an assistance system of the vehicle is performed as an exercise for the driver. For instance, the driver is invited to activate a lane-keeping assistant. Then the driver is invited to test out the lane-keeping assistant by moving the vehicle carefully onto a road-edge line or the like. The driver thereby gets to know a response of the lane-keeping assistant while also increasing his concentration on driving the vehicle. Similarly, it can also be provided to activate an autocruise system or an adaptive cruise control (ACC) and to enter various speeds or distances from a vehicle driving in front. In addition, activating, testing out or deactivating certain functions of an infotainment system, an air conditioning system or other added features of the vehicle can also be suggested as an exercise.

In one embodiment of the disclosure, one or more exercises are preferably performed at certain times given by a set schedule. In this case, it is possible in particular to provide breaks during an exercise or between different exercises in order to avoid overly distracting the driver. To the same end, a duration of individual exercises can be limited, for instance to a few minutes. According to one embodiment, the driver is offered a plurality of different exercises for selection. In addition, the driver can stipulate a delay to the start of an exercise. The number of possible delays can be limited in this case.

A system according to the disclosure for preventing a driving error owing to a lack of concentration when driving a motor vehicle contains an acquisition device for acquiring parameters that characterize a current driving situation. The system also contains a calculation module for determining on the basis of the acquired parameters a current level of monotony as a characterization of a monotony of the current driving situation, and a decision module for checking whether the current level of monotony exceeds a predetermined threshold. In addition, the system contains an exercise module for performing an exercise for the driver to increase concentration on driving the motor vehicle when the threshold is exceeded.

In a similar way to the corresponding method, the system according to the disclosure, by means of suitable exercises, already increases the concentration of the driver before tiredness or drowsiness occurs. Driving errors through a lack of concentration of the driver are thereby prevented effectively.

In particular, embodiments of the system according to the disclosure are designed to implement one of the methods described above.

Further embodiments of the system each correspond to embodiments of the method according to the disclosure and exhibit corresponding features and advantages.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
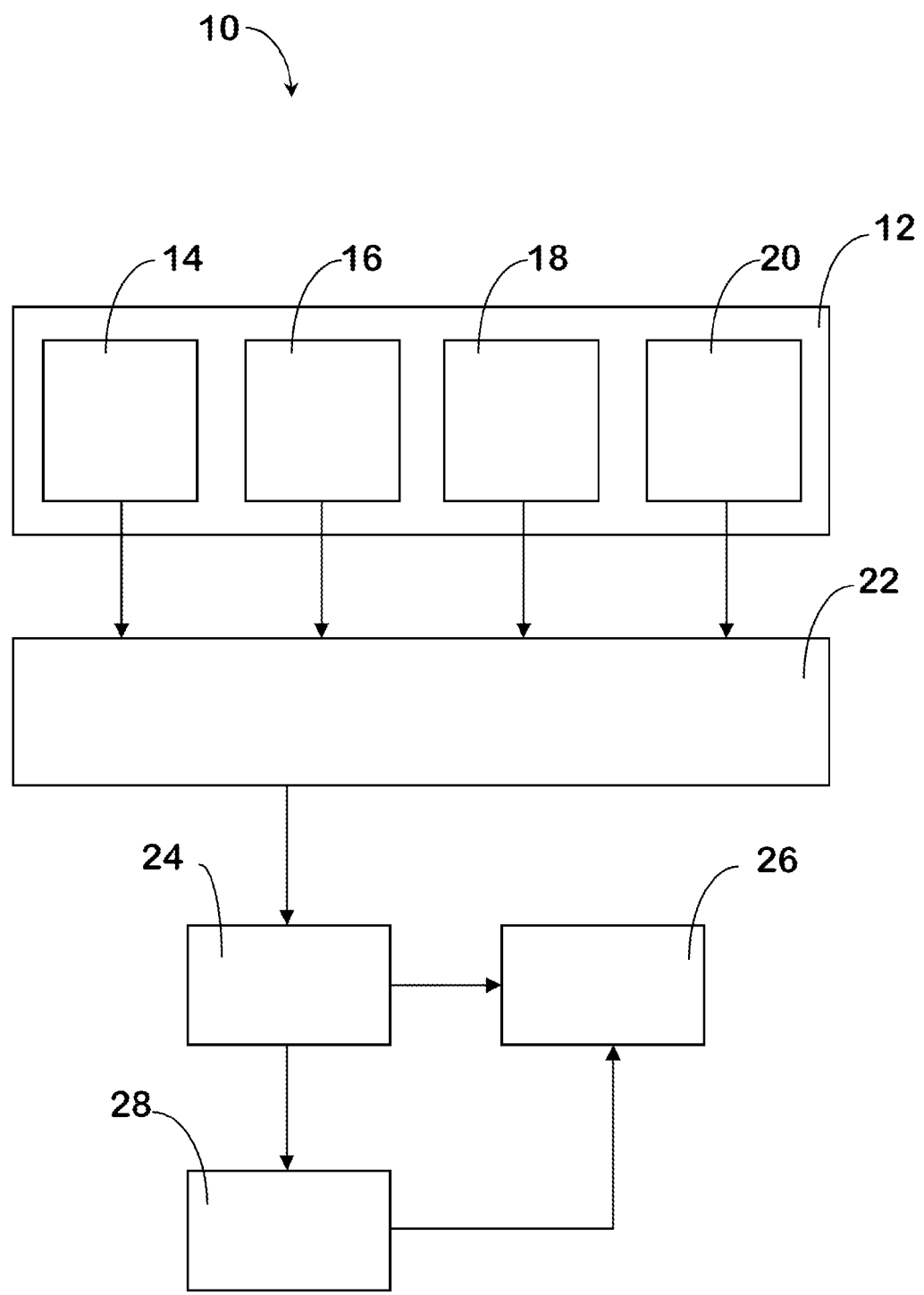
FIG. 1 is a schematic view of an exemplary embodiment of a system according to the disclosure for preventing concentration errors when driving a motor vehicle.

In FIG. 1, a system for preventing concentration errors when driving a motor vehicle is denoted by 10. The system 10 comprises an acquisition device 12 for acquiring parameters that characterize the current driving situation. All data or values that relate to the vehicle, the driver, the driving route or the driving environment and that are suitable for determining a level of monotony are designated here as parameters. These include, in particular, live or stored data from existing or additionally provided sensors, devices or systems of the vehicle, and data transmitted to the vehicle. Such data may be transmitted, for example, via a public wireless network, for instance a mobile communications link to the Internet or to another network, via a radio station, for example a Traffic Message Channel (TMC), or via a short-range link to other vehicles in the vicinity. In addition, it is also possible to use as parameters, values calculated by analyzing data, for instance average values and the like, and data reflecting a variation of a characteristic over time or according to location, for example data in the form of a table or a curve.

For this purpose, the acquisition device 12 contains an environment module 14 for acquiring live environment parameters relating to a driving environment. The environment module 14 can be used to acquire parameters relating to the time of day, light level, weather conditions, type of road, volume of traffic, landscape and the like. A type of road is understood to mean here not only a construction of the road being traveled, for example as a motorway or a country lane, but also a condition of this road, for instance roadworks, potholes etc. For this purpose, the environment module 14 acquires, inter alia, data from a vehicle clock, from an automatic lighting system, from a light sensor, from a windshield wiper controller, from a rain sensor, from a satellite positioning system (GPS) and from a navigation system. Parameters for a volume of traffic are acquired in particular using data from a radar system of the vehicle, from a Cloud-based information system in the Internet or from a wireless information transfer with other vehicles in the vicinity. The environment module 14 can also perform an analysis of this data in order to generate a parameter.

In addition, the acquisition device 12 comprises a load module 16 for acquiring live load parameters relating to a driver load. The load module 16 can acquire as parameters, inter alia, a frequency and intensity of use of a gas pedal and brake pedal, a frequency and intensity of control operations, a frequency of switching operations, a frequency and length of use of a direction indicator and of a high beam. In addition, the load module 16 can detect a viewing behavior of the driver, for example a frequency of use of a wing mirror or rearview mirror or of looking away from the roadway. Data from suitable sensors or devices of the vehicle are used for this purpose. In this case, the data can also be processed by the load module 16, for instance in order to determine a frequency of an operation in a certain time interval.

The acquisition device 12 comprises a vehicle status module 18 for acquiring live status parameters relating to a vehicle status. The vehicle status module 18 can acquire as parameters a speed pattern, a speed characteristic, an acceleration and deceleration characteristic, maximum values of the speed or of the acceleration, a frequency of acceleration and deceleration operations, a direction-change pattern, a direction-change characteristic, maximum values and frequency of direction changes and the like. In addition, the vehicle status module 18 can acquire as a parameter an activation of assistance systems, for example an autocruise system, an adaptive cruise control, a lane-keeping assistant, or of entertainment systems, for instance a radio, CD player etc. The vehicle status module 18 uses data from suitable sensors for this purpose and is designed to generate parameters by processing detected data.

In addition, the acquisition device 12 contains a route module 20 for acquiring live route parameters relating to the driving route. The route module 20 can acquire as route parameters a scheduled total travel time, a scheduled total distance, a remaining travel time or distance or until a scheduled destination or until a break etc. For this purpose, the route module 20 has access to data from a navigation system, and can be designed to generate further route parameters by processing acquired route data.

The system 10 also contains a calculation module 22 for calculating a current level or degree of monotony of a driving situation. For this purpose, the calculation module 22 receives acquired parameters from the acquisition device 12, and uses a probability function or a weighting function to calculate the current level of monotony. This can be done using numerical or statistical techniques known to a person skilled in the art, and taking into account all the acquired parameters or even just a selection thereof.

In an alternative exemplary embodiment, the environment module 14, the load module 16, the vehicle status module 18 and the route module 20, or the acquisition device 12, are each designed to generate an estimated value for respectively the environment, the load on the driver, the vehicle status and the route. The calculation module 22 then uses these estimated values to calculate the current level of monotony.

In order to check whether the current level of monotony exceeds a predetermined threshold, the system 10 contains a decision module 24. Said check of current levels of monotony is performed continuously or cyclically at preset time intervals. The threshold can be fixed or can be varied.

In particular, the threshold can depend on specific parameters such as the age or the experience of the driver, for instance. It is also possible for the threshold to be adapted dynamically during a journey. On ascertaining that the threshold is exceeded, the decision module 24 initiates an exercise for the driver for the purpose of increasing concentration on driving the motor vehicle. If during an exercise, the current level of monotony lies below the threshold, the decision module 24 can stop the exercise.

The system 10 contains an exercise module 26 for performing exercises. The exercise module, 26, for example, performs exercises stored in a memory, using a human/machine interface 28 of the vehicle in the process. In particular, the exercises are designed to be interactive, with the exercise module 26 outputting instructions or tasks for the driver and receiving responses or reactions via the human/machine interface 28. In this case, the exercise module 26 can assess the reaction of the driver and present this assessment to the driver in the form of a score, for instance, and store this assessment for comparison with later exercises. In addition, the exercise module 26 is designed to offer a selection of exercises for the driver and to accept a limited number of delays by the driver. Alternatively, the exercise module 26 can make a selection and take into account in this selection exercises already performed and their assessment.

Other ways in which the components of the system 10 operate and interact are described below in connection with an exemplary embodiment of the method for preventing driver concentration errors when driving a motor vehicle.

Figure 2:
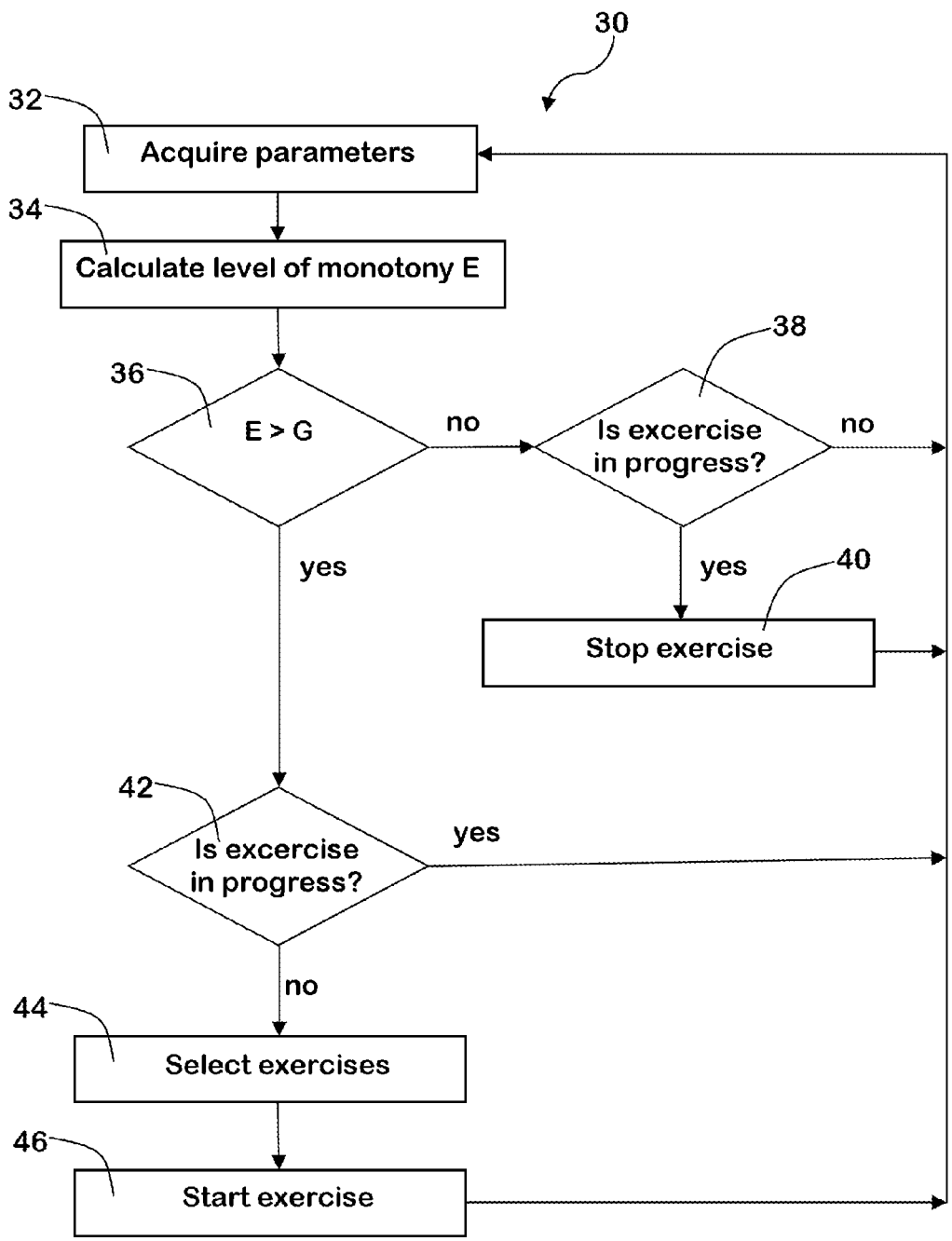
FIG. 2 is a schematic diagram of an exemplary embodiment of a method according to the disclosure for preventing concentration errors when driving a motor vehicle.

FIG. 2 shows schematically an exemplary embodiment of a method 30 for preventing concentration errors when driving a motor vehicle. The first step is acquiring 32 parameters that characterize the current driving situation and are suitable for calculating a level of monotony. In particular, a selection of the above-described environment parameters, load parameters, status parameters and route parameters can be acquired as parameters by the acquisition device 12.

Next, the acquired parameters are used to calculate 34 a current level of monotony E. This can be done by the calculation module 22 using a probability function, a weighting function or another numerical or statistical technique known to a person skilled in the art, and taking into account all the acquired parameters or even just a selection thereof. In addition, it is possible to weight individual parameters or even to apply a particular weighting to a plurality of interacting parameters. A sum of the weighted parameters can then be obtained, for instance. Thus the level of monotony is a probability value or estimated value of the monotony of a driving situation. It is also possible for the calculation of the current level of monotony to take into account previously calculated levels of monotony that are stored in a memory. The magnitude and duration of previous levels of monotony are thereby incorporated in the calculation of the current level of monotony.

The method 30 now checks 36 whether the calculated current level of monotony E exceeds a threshold G. If the level of monotony E is less than the threshold G, the method checks 38 whether an exercise is currently being performed. If this is not the case, the method 30 continues with the acquisition 32 of parameters. If an exercise for the driver is currently in progress, this exercise is first stopped 40 before acquisition 32 of parameters is performed. Exercises are thereby stopped when there is a change in the driving situation that requires the driver's attention. Such driving situations may be, for instance, exiting a motorway or entering an urban traffic area.

If the check 36 establishes that the level of monotony E exceeds the threshold G, the method again checks 42 whether an exercise is currently in progress. If an exercise is already being performed, the method 30 continues with the acquisition 32 of parameters. Otherwise, a selection 44 of exercises for the driver is offered. All the checks 36, 38, 42 described here can be performed by the decision module 24.

In another exemplary embodiment of the method or of the system, performing an exercise can be inhibited for a remaining journey period to the destination or until a scheduled break below a predetermined threshold.

To select 44 an exercise, the driver is first presented with a plurality of different exercises. This can be done by a voice output or a display on a screen, for example. Then a selection by the driver is captured by the exercise module 26 via a human/machine interface 28. At this point the driver can also select a delay to the exercise. The system 10 and the method 30 preferably allow only a certain number of delays, however. Finally, the exercise module 26 starts 46 the selected exercise for the driver, and the method 30 continues in a loop with the acquisition 32 of parameters.

Examples of exercises are driving according to a specified driving behavior or activating and testing out assistance systems, infotainment systems, an air conditioning system or other added features of the vehicle, which are performed in accordance with a preset or dynamically adapted schedule by means of the exercise module 26. The schedule specifies particularly the form, duration and number of the exercises, and also the duration and number of breaks during an exercise and between the exercises.

The exercise module 26 outputs instructions, tasks, suggested exercises, assessments and so on via a human/machine interface 28, for example in the form of voice output or as a suitable icon on a head-up display or on another display of the vehicle. In another exemplary embodiment, instructions on the driving behavior can also be passed to the driver by initiating certain functions of a massage seat.

An example of a specified driving behavior as an exercise may be a change of lane, driving at a certain speed, decelerating or accelerating slightly, assuming a certain lateral alignment of the vehicle inside a lane, switching on a high beam or a direction indicator, and the like. In this case, it is possible to select one or more of these driving behaviors in a random order. In addition, the driver can be invited to follow a fuel-saving driving behavior such as, for example, a pulse & glide style or making optimum gear changes, for instance between fifth and sixth gear. If the vehicle has a head-up display, as a further exercise, small virtual objects can be displayed on the roadway that the driver must drive over by making very slight steering movements in order to score points.

When an exercise is in the form of activating and testing out assistance systems, the driver can be invited, for example, to activate a lane-keeping assistant and then to test out the lane-keeping assistant by moving the vehicle carefully onto a road-edge line or the like. Similarly, activating an autocruise system or an adaptive cruise control (ACC) and entering various speeds or distances from a vehicle driving in front can also be provided as an exercise.

The exercises are designed in particular such that only simple maneuvers are carried out without sudden changes in driving behavior. During the exercises, the driver is not required to look away from the roadway, or is required to look away only very briefly. Thus the driver can make inputs by means of a multifunction steering wheel or by voice commands, for example. Likewise, instructions for the driver are preferably given by a voice output or suitable icons on a display. Breaks during and between the exercises and a limited duration of the exercises prevent the driver being overly distracted.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for preventing driver concentration errors comprising:
   acquiring parameters that characterize a current driving situation of a vehicle;
   calculating, based on the acquired parameters, a current level of monotony as a characterization of a monotony of the current driving situation, wherein calculating the current level of monotony accounts for previous levels of monotony over one or more of a specified time period and a specified distance;
   checking whether the calculated current level of monotony exceeds a predetermined threshold; and
   driving according to a specified behavior to increase concentration on driving the motor vehicle when the threshold is exceeded.

2. The method as claimed in claim 1, wherein the acquired parameters include at least one live environment parameter for characterizing a driving environment.

3. The method as claimed in claim 1, wherein the acquired parameters include at least one live load parameter for characterizing a driver load.

4. The method as claimed in claim 1, wherein the acquired parameters include at least one live status parameter for characterizing a vehicle status.

5. The method as claimed in claim 1, wherein the acquired parameters includes at least one live parameter for characterizing a travel route.

6. The method as claimed in claim 1, wherein the specified behavior includes activating and deactivating an assistance system of the vehicle.

7. The method as claimed in claim 1, wherein the specified behavior includes offering one or more exercises at certain times given by a preset schedule.

8. A vehicle system comprising:
   an acquisition device configured to acquire parameters that characterize a current driving situation;
   a calculation module configured to, based on the acquired parameters, determine a current level of driving situation monotony, wherein the current level of monotony accounts for previous levels of monotony over one or more of a specified time period and a specified distance;
   a decision module configured to check if the current level of driving situation monotony exceeds a predetermined threshold; and
   an exercise module configured to present an exercise such that a driver drives according to a specified behavior to increase driving concentration if the threshold is exceeded.

9. The system as claimed in claim 8, wherein the exercise includes one or more exercises at predefined times according to a preset schedule.

10. The system as claimed in claim 8, wherein the exercise includes one or more of activating and deactivating an assistance system of the vehicle.

11. The system as claimed in claim 8, wherein a description of the exercise is output via a human/machine interface of the vehicle.

12. A method for improving driving focus comprising:
    in response to acquired driving parameters, via an acquisition device, indicative of a monotony level of a driving situation being above a predetermined threshold, instructing a driver, via an exercise module, to perform an exercise to increase a concentration level, wherein the exercise is a set of exercises performed at predefined times specified by a preset schedule, wherein the monotony level includes previous monotony levels over a specified time period and a specified distance.

13. The method as claimed in claim 12, wherein the acquired driving parameters include at least one live environment parameter indicative of a driving environment.

14. The method as claimed in claim 12, wherein the acquired driving parameters include at least one live load parameter indicative of a driver load.

15. The method as claimed in claim 12, wherein the acquired driving parameters include at least one live status parameter indicative of a vehicle status.

16. The method as claimed in claim 12, wherein the acquired driving parameters include at least one live parameter indicative of a travel route.

* * * * *